UNITED STATES PATENT OFFICE 2,271,873

DIBUTYL ETHERS OF POLYGLYCOLS

Granville A. Perkins, Charleston, Thomas F. Carruthers, South Charleston, and Jared W. Clark, Charleston, W. Va., assignors to Carbide and Carbon Chemicals Corporation, a corporation of New York No Drawing. Application July 24, 1937,
Serial No. 155,434

2 Claims. (Cl. 260—615)

This invention relates to diethers of glycols and polyglycols, and to alkali metal derivatives of monoethers of glycols and polyglycols, and it includes processes for making these substances.

Numerous diethers of glycols and polyglycols are known and used for many purposes, such as solvents, plasticizers and the like. The method of preparation ordinarily employed consists in reacting a dihalogenated dialkyl ether with an alkali metal derivative of an alcohol, and the usual method of preparing this alkali metal derivative has been to react the alcohol with the alkali metal itself. This method of preparation is not easily adaptable to commercial production in that the use of large quantities of alkali metal, such as sodium, is dangerous and expensive.

An object of this invention is to provide a simple method for producing diethers of glycols and polyglycols which is easily applicable to commercial production. A second object is to provide certain new diethers of glycols and polyglycols which are excellent high boiling solvents and plasticizers. A third object is to provide a simple and economical method for producing alkali metal derivatives of monoethers of glycols and polyglycols. A fourth object is to provide certain new alkali metal derivatives of monoethers of glycols and polyglycols which may be used to advantage in preparing the above diethers. Other objects will be apparent from the following description.

Instead of preparing these glycol diethers by reaction of dihalogenated dialkyl ethers with alkali metal derivatives of alkyl or aryl alcohols, they may be prepared by reacting monohalogenated compounds with the alkali metal derivatives of monoethers of glycols and polyglycols. Furthermore, if these alkali metal derivatives are reacted with dihalogenated ethers or diesters of polyglycols, diethers of long chain polyglycols are formed.

In the preparation of these diethers, it has been found that the alkali metal derivatives of monoethers of glycols and polyglycols may be prepared without resorting to the use of the uncombined alkali metal itself by treating the monoether of the glycol or polyglycol with the alkali metal hydroxide and distilling the water therefrom. Caustic soda may be used as the alkali metal hydroxide in the reaction, or other alkali metal hydroxides, such as potassium hydroxide may be used. The temperature at which the reaction of the hydroxide and the monoether of the glycol or polyglycol is conducted can be varied widely, although the preferred temperature is that at which the water formed during the reaction will be distilled from the mixture, either alone or in admixture with unreacted monoether. This alkali metal derivative, which may be called a "glycol metal monoether," is preferably reacted with a monochlorinated compound or dichloride ester of a glycol or polyglycol at an elevated temperature and in an inert solvent, such as the original monoether. The use of such a solvent is not necessary, but is provides a more convenient reaction mass to handle.

The following examples are given to illustrate the preparation of several diethers of ethylene glycol and polyethylene glycols:

EXAMPLE I.—*Tetraethylene glycol dibutyl ether*

3600 parts by weight of ethylene glycol monobutyl ether $C_4H_9OC_2H_4OH$ were heated with 1000 parts by weight of a 50% aqueous solution of caustic soda, the water being removed as an azeotropic mixture with the excess ethylene glycol monobutyl ether. The resulting compound, which may be called ethylene glycol sodium monobutyl ether, $C_4H_9OC_2H_4ONa$, was added with stirring to 925 parts by weight of diethylene glycol dichloride, $(ClC_2H_4)_2O$ (also called $\beta,\beta'$-dichlorethyl ether), at 90 C. over a period of 4 hours, and then heated for an additional 6 hours. The reaction mixture was filtered to remove salt and distilled under reduced pressure. This product, which may be called tetraethylene glycol dibutyl ether $(C_4H_9OC_2H_4OC_2H_4)_2O$, is a water-white liquid having a boiling point of 170° C. at an absolute pressure of 5 mm. of mercury, and a specific gravity of 0.944 at 20°/20° C.

EXAMPLE II.—*Pentaethylene glycol dibutyl ether*

The ethylene glycol sodium monobutyl ether was prepared as in Example I from 3600 parts by weight of ethylene glycol monobutyl ether and 1000 parts of a 50% solution of caustic soda. After removal of the water, this material was added to 1160 parts by weight of triethylene glycol dichloride, $ClC_2H_4OC_2H_4OC_2H_4Cl$, at 90° C. over a period of 11 hours. The reaction mixture was filtered to remove salt and distilled under reduced pressure. The product, pentaethylene glycol dibutyl ether $$(C_4H_9OC_2H_4OC_2H_4OCH_2.)_2$$ 

is a water-white liquid boiling between 187° and 190° C. under a pressure of 2.5 mm. of mercury, and having a specific gravity of 0.964 at 20°/20° C.

EXAMPLE III.—*Hexaethylene glycol dibutyl ether*

2880 parts by weight of diethylene glycol monobutyl ether were heated with 800 parts by weight of a 50% aqueous solution of caustic soda, in the presence of 870 parts by weight of toluene. The water formed during the reaction was removed by distillation in admixture with toluene. The product of this reaction, which may be called diethylene glycol sodium monobutyl ether, $C_4H_9OC_2H_4OC_2H_4ONa$, was added to 715 parts by weight of diethylene glycol dichloride $(ClC_2H_4)_2O$ over a period of 12 hours at 90° C. The reaction mixture was filtered to remove salt and distilled under reduced pressure. The product, hexaethylene glycol dibutyl ether $$(C_4H_9OC_2H_4OC_2H_4OC_2H_4)_2O$$

is a water-white liquid which boils at 194° C. at a pressure of 1 mm. of mercury, and has a specific gravity of 0.983 at 20°/20° C.

The dibutyl ethers of tetra-, penta-, and hexaethylene glycol are high boiling solvents and excellent plasticizers for resinous materials. The dimethyl ether of tetraethylene glycol is a substance having considerable utility in the field of heat and pressure transmission, and this material can be efficiently prepared by means of the process shown above.

The above examples are specific illustrations of the invention, which includes the preparation of diethers of glycols and polyglycols from the reaction of halogenated compounds, alcohol ethers, and alkali metal hydroxides, and the preparation of the new compounds given in the examples.

The foregoing description is by way of illustration only and the invention should not be limited other than as defined by the appended claims.

We claim:

1. As chemical compounds, the dibutyl ethers of the polyethylene glycols having from four to six ethylene glycol units in the molecule.

2. As a chemical compound, hexaethylene glycol dibutyl ether.

GRANVILLE A. PERKINS.
THOMAS F. CARRUTHERS.
JARED W. CLARK.